United States Patent
Peng et al.

(10) Patent No.: US 10,241,803 B2
(45) Date of Patent: Mar. 26, 2019

(54) SYSTEM AND METHOD FOR UPDATING DEVICE SOFTWARE

(71) Applicant: SCHNEIDER ELECTRIC IT CORPORATION, West Kingston, RI (US)

(72) Inventors: Wen-Chun Peng, New Taipei (TW); Hsin-Hsiao Lin, New Taipei (TW)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 90 days.

(21) Appl. No.: 15/283,552

(22) Filed: Oct. 3, 2016

(65) Prior Publication Data
US 2018/0095769 A1    Apr. 5, 2018

(51) Int. Cl.
  *G06F 15/177*    (2006.01)
  *G06F 1/24*      (2006.01)
  *G06F 9/4401*    (2018.01)
  *G06F 8/654*     (2018.01)

(52) U.S. Cl.
  CPC ............ *G06F 9/4401* (2013.01); *G06F 8/654* (2018.02)

(58) Field of Classification Search
  None
  See application file for complete search history.

(56) References Cited

U.S. PATENT DOCUMENTS

| | | | | |
|---|---|---|---|---|
| 6,185,696 B1 * | 2/2001 | Noll | ..................... | G06F 11/1417 714/11 |
| 6,266,736 B1 * | 7/2001 | Atkinson | ................ | G06F 8/656 711/103 |
| 8,601,255 B2 * | 12/2013 | Yang | ......................... | G06F 8/65 713/1 |
| 9,298,554 B2 * | 3/2016 | Sahu | ...................... | G06F 9/4403 |
| 9,880,908 B2 * | 1/2018 | Jeansonne | ........... | G06F 11/1469 |
| 2002/0147941 A1 * | 10/2002 | Gentile | ............... | G06F 11/1417 714/36 |
| 2003/0028800 A1 * | 2/2003 | Dayan | ................. | G06F 11/1433 726/34 |
| 2007/0050612 A1 | 3/2007 | Chen | | |
| 2011/0066837 A1 * | 3/2011 | Lee | ........................ | G06F 9/4401 713/2 |
| 2011/0320794 A1 * | 12/2011 | Yang | ................... | G06F 11/1004 713/1 |
| 2012/0210165 A1 | 8/2012 | Lambert et al. | | |
| 2013/0268746 A1 * | 10/2013 | Hsu | ....................... | G06F 21/572 713/2 |
| 2014/0310698 A1 * | 10/2014 | Lee | ........................ | G06F 8/654 717/168 |
| 2016/0187420 A1 * | 6/2016 | Trethewey | ....... | G01R 31/31705 714/727 |
| 2017/0250818 A1 * | 8/2017 | Deierling | .............. | H04L 9/3247 |

OTHER PUBLICATIONS

Extended European Search Report from corresponding European Application No. 17194044.8 dated Feb. 20, 2018.

\* cited by examiner

*Primary Examiner* — Nitin C Patel (74) *Attorney, Agent, or Firm* — Lando & Anastasi, LLP (57) ABSTRACT

Devices include a processor and a memory. The processor is configured to determine if a bootloader area does not contain a valid bootloader instruction set, to locate a bootloader instruction set, and to copy the bootloader instruction set to the bootloader area. The processor then executes the bootloader instruction set from the bootloader area.

8 Claims, 6 Drawing Sheets

SYSTEM AND METHOD FOR UPDATING DEVICE SOFTWARE

BACKGROUND

1. Field of Disclosure

At least some embodiments described herein relate generally to devices having stored instruction sets, such as may be stored in firmware, and methods for updating the instruction sets.

2. Discussion of Related Art

Many devices utilize programmable components that execute software instructions and require a starting point upon bootup. Such devices include processors or microcontrollers that often store initial instructions, or in some cases all instructions and applications, in flash memory coupled to or contained within the controller. Often, a bootloader stored in flash includes the initial instructions that may establish starting variables or conduct power-on self-tests (POST) before passing control to a core application or operating system. Such a bootloader may also be responsible for processing updates to the core application, and sometimes the bootloader itself may need to be updated.

SUMMARY

Various aspects of the present disclosure relate to methods and apparatuses for managing updates to a bootloader.

According to one aspect, a device includes a memory and a processor coupled to the memory. The processor is configured to determine that a bootloader area does not contain a valid bootloader instruction set, locate a bootloader instruction set, copy the bootloader instruction set to the bootloader area, and execute the bootloader instruction set from the bootloader area.

According to some embodiments, the processor is further configured to read a bootloader signature to determine that the bootloader area does not contain a valid bootloader instruction set. In some embodiments, the processor is further configured to use at least one of a length of the bootloader instruction set and a memory pointer to locate the bootloader instruction set. In some embodiments, the processor is further configured to read a value from a predetermined location of the memory to locate the bootloader instruction set. In some embodiments, the bootloader area is within the memory. In some embodiments, the processor is further configured to buffer the bootloader instruction set and store an indicator of a location of the bootloader instruction set. The processor may be further configured to store the indicator at a predetermined location of the memory.

According to another aspect, a method of controlling a device having a processor and a memory includes determining that a bootloader area does not contain a valid bootloader instruction set; locating a bootloader instruction set, copying the bootloader instruction set to the bootloader area, and executing the bootloader instruction set from the bootloader area.

According to some embodiments, the method includes reading a bootloader signature to determine that the bootloader area does not contain a valid bootloader instruction set. In some embodiments, the method includes using at least one of a length of the bootloader instruction set and a memory pointer to locate the bootloader instruction set. In some embodiments, the method includes reading a value from a predetermined location of the memory to locate the bootloader instruction set. In some embodiments, the method includes buffering the bootloader instruction set and storing an indicator of a location of the bootloader instruction set. The indicator may be stored at a predetermined location of the memory.

According to another aspect, a method of controlling a device having a processor and a memory includes receiving notification of a new bootloader instruction set, storing in the memory an indicator of a location of the new bootloader instruction set, and storing in the memory an indication that a bootloader area of the memory does not contain a valid bootloader instruction set.

According to some embodiments, the method includes receiving the new bootloader instruction set and buffering the new bootloader instruction set. In some embodiments, the method includes erasing the bootloader area. In some embodiments, the method includes copying the new bootloader instruction set into the bootloader area. In some embodiments, the indicator of a location of the new bootloader instruction set includes at least one of a memory pointer and a length of the new bootloader instruction set. In some embodiments, the indicator of a location of the new bootloader instruction set is stored at a predetermined location of the memory. In some embodiments, storing the indicator of the location of the new bootloader instruction set includes storing an indication that the bootloader area does not contain a valid instruction set.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying drawings, which are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Many devices operate with the assistance of a processor or a controller that executes instructions, and upon initial start, such as powering on or booting up, the processor or controller has a fixed location from which the instructions are stored and read. The instructions at the fixed location can then control or instruct the processor or controller further and may pass control to various programs or applications, and the system may run under the scheme of an operating system, which is itself a set of instructions, or another application. Typically, the first set of program instructions executed by a processor or a controller is a bootloader. The bootloader may establish operating parameters or conduct system tests, among other things, before passing control to a core application or operating system. The bootloader may be involved in updating the core application and sometimes the bootloader itself needs to be updated. There exists a risk when the bootloader is updated that something may go wrong leaving the bootloader in an invalid or corrupted state. Because the bootloader is the first program the controller attempts to execute, a corrupt or invalid bootloader may leave the controller unable to do anything, thereby causing the device to malfunction.

Figure 1:
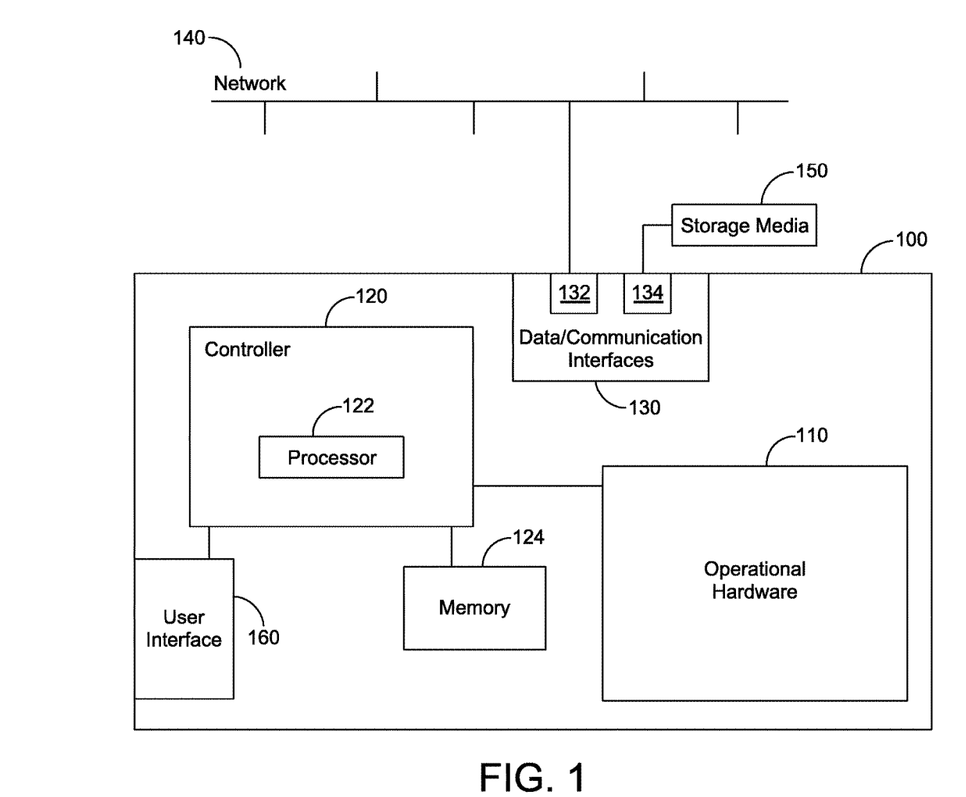
FIG. 1 is a block diagram of a device in accord with aspects and embodiments of the present disclosure.

FIG. 1 illustrates a device 100 in accord with the present disclosure. The device 100 includes operational hardware 110 that provides function-specific and/or core operations of the device, examples of which are described further below. The device 100 is controlled, in part, by a controller 120 including a processor 122. The controller 120 controls the hardware 110, at least in part, by the processor 122 executing instructions held in a memory 124. In some embodiments, the memory 124 may be included with the controller 120, or the memory 124 may be any combination of internal memory included in the controller 120 or other memory coupled to the controller 120. The controller 120 is also coupled to one or more data/communications interfaces 130, such as network interface 132 and peripheral interface 134.

Network interface 132 may be coupled to a network 140 to provide communication with other systems and to receive external data or instruction sets. Example networks include wired networks (e.g., Ethernet, token ring, FDDI, DOCSIS, and the like) or wireless networks (e.g., Wi-Fi, IEEE 802.11, cellular, and the like). Peripheral interface 134 allows coupling of various peripherals, for example the storage media 150 that may be used to externally store data or instruction sets or to provide external data or instruction sets. Examples of the peripheral interface 134 include Universal Serial Bus (USB), secure digital (SD), compact flash (CF), IEEE 1394, FireWire, thunderbolt, and the like. Additionally, the controller 120 is coupled to a user interface 160 to allow user control and configuration of the controller 120, the operational hardware 110, the interfaces 130, and other aspects of the device 100. The user interface 160 may include or allow for input devices such as, for example, switches, mouse, keypad, keyboard, and/or touchscreen, and may include or allow for output devices such as, for example, visual indicators, audible indicators, and/or a display.

Examples of a device 100 that may have operational hardware 110 and a controller 120 include, but are not limited to, communications network gear such as routers and switches; environmental control equipment such as heating, ventilation, and air conditioning (HVAC) systems, sensors, and controls, computer room air handlers (CRAH's), rack-mounted air conditioners (RMAC's) and computer room air conditioners (CRAC's); computing equipment; power distribution equipment such as generators, uninterruptible power supplies (UPS), managed outlets, and assorted controls; and industrial process management equipment such as automatic control devices (ACD's), flow and temperature sensors, actuators, heaters, and the like. Each of these devices may have operational hardware 110 to provide the beneficial operation of the device. Examples of operational hardware 110 include, but are not limited to, for example, in a UPS: power input ports, power output ports, sensors, monitors, power conversion hardware, and energy storage, such as a battery. In another example, an HVAC system may include operational hardware 110, such as, motors, fans, compressors, condensers, coils, heating elements, temperature and airflow sensors, etc. Example components of the controller 120 that may be part of any such device 100 include, but are not limited to, the ARM® Cortex®-M processor family.

In at least some devices, the controller 120 includes the processor 122 and a fixed memory 124, such as flash memory, from where the processor 122 will retrieve first instructions upon startup. A bootloader is a set of instructions, executable by the processor 122, stored in a bootloader area conventionally beginning at the first memory location of the memory 124.

In at least some embodiments described herein, the beginning of memory 124 is programmed with a new instruction set, termed a bootloader guardian, that contributes to prevent the device 100 from becoming inoperable due to an interrupted update to the bootloader. The bootloader guardian allows determining that no valid bootloader exists and allows completion of the bootloader update by finding the new bootloader and copying it into the bootloader area. In this way, the processor 122 always has valid initial instructions available to execute, and those instructions are able to recover from a failed bootloader update. Accordingly, the device 100 will return to an operable state even if a bootloader update is unexpectedly interrupted.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Figure 2:
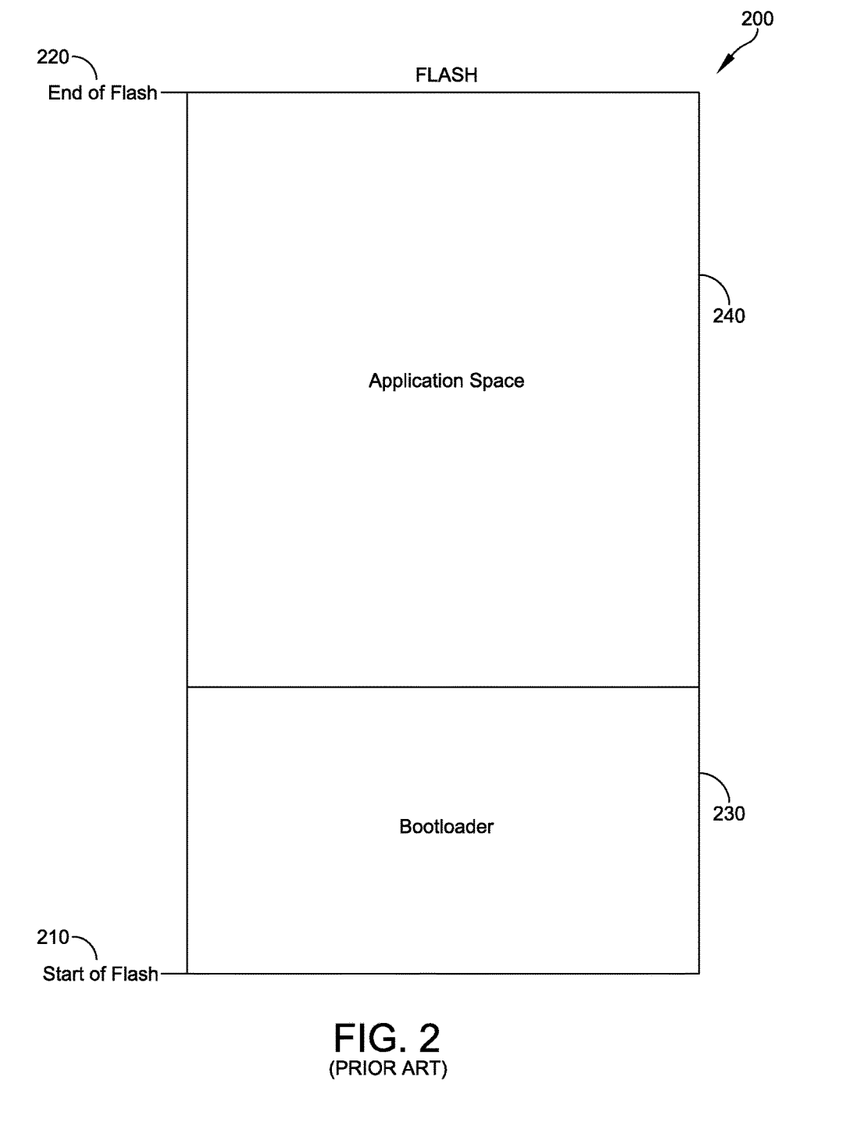
FIG. 2 is a schematic diagram of a conventional allocation of flash memory to a set of firmware instructions.

FIG. 2 illustrates a conventional arrangement of a memory 200 (e.g., flash memory) containing instructions to be executed by a controller processor in a device. The memory 200 has a start 210 at the beginning, or first, memory location within the memory 200 and an end 220 at the end, or last, memory location. The memory 200 has a bootloader 230 and an application space 240. The bootloader 230 begins at the start 210 and includes a set of instructions for the processor to run at boot time. Generally, after a processor completes the bootloader 230 instructions, the processor is directed (e.g., by the bootloader instructions) to retrieve the next instructions from the application space 240, wherein one or more core application(s) or operating systems are stored. At various times, any of the application(s) or the bootloader 230 may need to be updated to, e.g., add functionality to the device or correct bugs or errors in the programming of the device.

When a set of instructions in the application space 240 is to be updated, the bootloader 230 may be launched (i.e., a processor executes instructions from the bootloader 230) to handle the update process. The processor, executing instructions of the bootloader 230, may receive new application firmware (i.e., a new instruction set) from, for example, a network via a network interface, or a memory card coupled to a physical interface, or elsewhere. For some types of memory devices, memory spaces need to be erased before new contents may be written to the spaces, such as is typical with flash memory, for example. Accordingly, the bootloader 230 may instruct the processor to first erase part or all of the application space 240 to accommodate updated application instructions. To complete the application update, the bootloader 230 instructs the processor to write the new application firmware into the application space 240.

When the bootloader 230 is to be updated, the bootloader 230 instructions may handle the process in much the same way as when instructions in the application space 240 need updating. However, the bootloader 230 instructions generally should not be erased from the memory 200 while the bootloader 230 instructions are actively running from the memory 200, so the processor typically copies some portion of code, such as a portion of the bootloader 230, to another memory area, such as to another area of the memory 200 or other memory, e.g., a random access memory (RAM), coupled to the processor. The portion of code copied then controls the processor to continue the process of erasing a portion of the memory 200 (the portion of the memory 200 needed to contain the new bootloader instruction set), receiving the new bootloader firmware, and writing the new bootloader into the erased portion of the memory 200.

The above described bootloader update process has an inherent risk that as soon as the portion of memory 200 that contains the existing bootloader 230 begins to be erased, the memory 200 will no longer have a valid bootloader 230 until the process is fully complete. If a failure occurs during this time, for example, by a power interruption, the device will fail to boot up the next time it comes on, because the processor will not find valid instructions when it looks to the start 210 of the memory 200.

Figure 3:
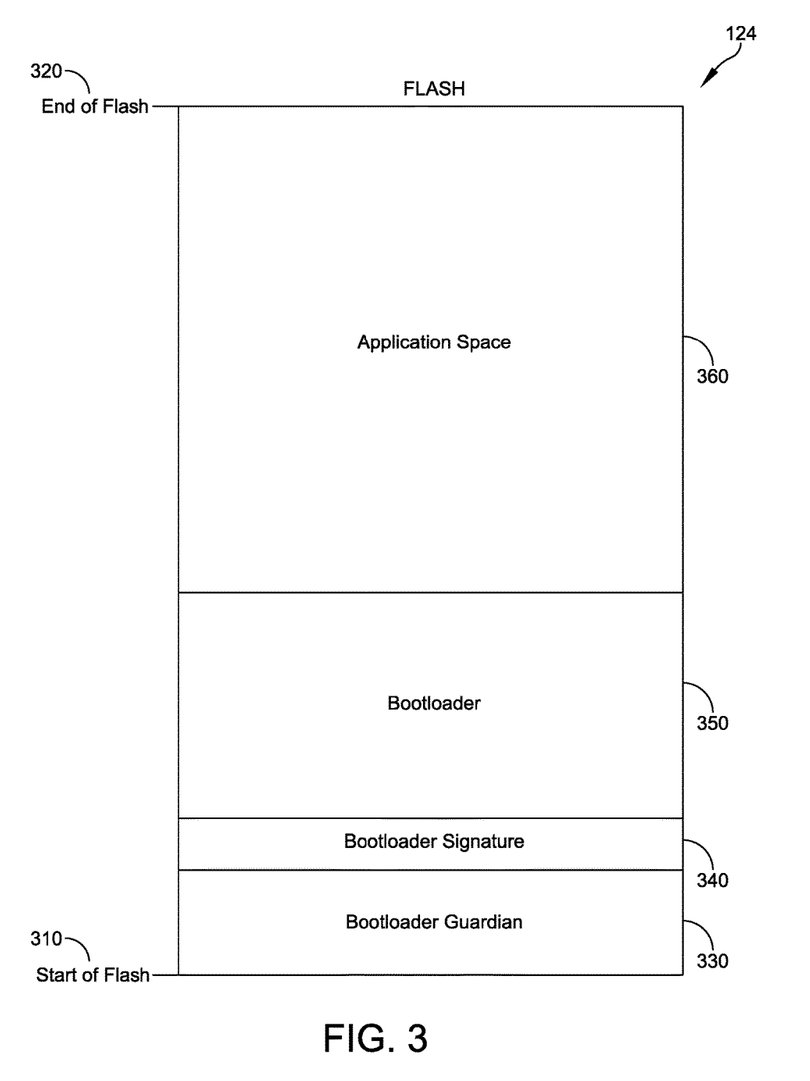
FIG. 3 is a schematic diagram of an example allocation of flash memory to a set of firmware instructions in accord with aspects of the present disclosure.

FIG. 3 illustrates the memory 124 (e.g., flash) containing an arrangement and instructions in accord with aspects and embodiments disclosed herein. The memory 124 has a start 310 and an end 320, and contains a bootloader guardian 330 instruction set that the processor 122 will execute early, or first, during a start or bootup sequence, and a bootloader signature 340 that will indicate whether a bootloader 350 is valid. The memory 124 also includes an application space 360 that contains one or more applications to be executed upon successful start or bootup. In the example embodiment illustrated in FIG. 3, the bootloader guardian 330 begins at the start 310 of the memory 124, where the bootloader 350 may have conventionally resided. In other embodiments, the bootloader guardian 330 may be located elsewhere, in the memory 124 or another memory coupled to the processor 122, but in a location where the processor 122 will execute in a start or bootup process, e.g., where the bootloader guardian 330 will execute first, or very early, in a start or bootup process.

As described in more detail below, the bootloader guardian 330 provides a recovery mechanism if a bootloader update fails, in part by looking to the bootloader signature 340 to indicate such a failure. The bootloader guardian 330 can be a relatively small set of instructions that will recover a new bootloader if a bootloader update has failed, but otherwise will allow the bootloader 350 to execute as usual.

Figure 4:
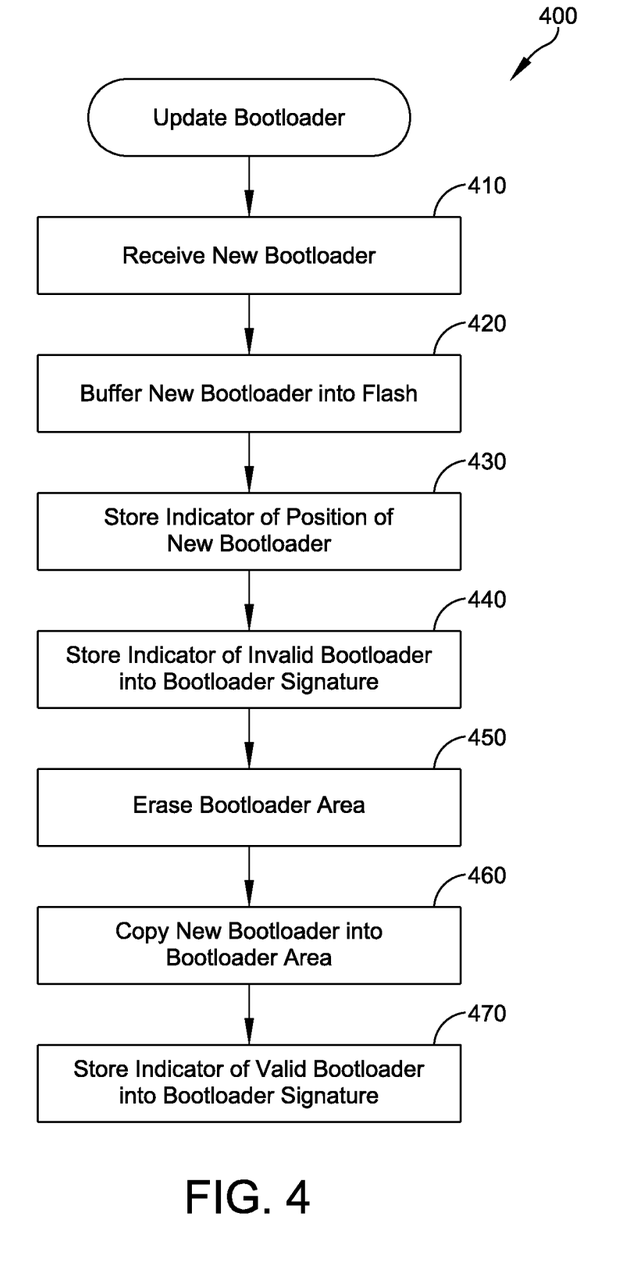
FIG. 4 is a flow diagram of an example process for updating a bootloader in accord with aspects of the present disclosure.

FIG. 4 is a flow diagram illustrating a bootloader update process 400 executed by the processor 122 in the device 100. The bootloader update process 400 is further described with reference to FIG. 5, which illustrates usage allocation of the memory 124 during portions of the bootloader update process 400. At the outset of the bootloader update process 400, the bootloader 350 instruction set is running and valid and the bootloader signature 340 indicates that the bootloader 350 is valid and residing in its usual location in memory 124, e.g., the bootloader area 530. The new bootloader 510 is received at block 410 and buffered into flash (e.g., the memory 124) at block 420. To buffer the new bootloader 510 into flash at block 420 may require the process 400 to erase an area of flash to make room for the new bootloader 510, such as the area shown in FIG. 5. The process 400 also stores an indicator 520 of the location of the new bootloader 510, at block 430. In case the bootloader update fails, the indicator 520 of the location of the new bootloader 510 may be used by the bootloader guardian 330 to recover and establish the new bootloader 510 as the replacement for the bootloader 350.

In one embodiment, the indicator 520 is written to the memory 124 at a predetermined location, such as, for example, near the end 320 of the memory 124, and the new bootloader 510 is buffered immediately adjacent to the indicator 520. The indicator 520 may be a pointer to a memory address or a memory offset of the beginning position of the new bootloader 510 in the memory 124. The result is that the bootloader guardian 330 can know or determine from the indicator 520 both the location and length of the new bootloader 510, as necessary. The length of the new bootloader 510 is the size of the new bootloader 510 instruction set in a unit of measure such as, for example, bytes, words, long words, and the like. In other embodiments, either of the new bootloader 510 and/or the indicator 520 may be buffered or written elsewhere, or an alternate pointer may indicate the location of either the indicator 520 or the new bootloader 510. Additionally, in other embodiments, the indicator 520 may include only the length of the new bootloader 510 or may include both the location and length of the new bootloader 510. For example, with the same arrangement of FIG. 5, wherein the indicator 520 is at the very end 320 of the memory 124 and the new bootloader 510 occupies the area of memory 124 immediately ahead of the indicator 520, the indicator 520 may indicate the length of the new bootloader 510, rather than the starting location, and from the length of the new bootloader 510 the starting location may be easily determined.

Figure 5:
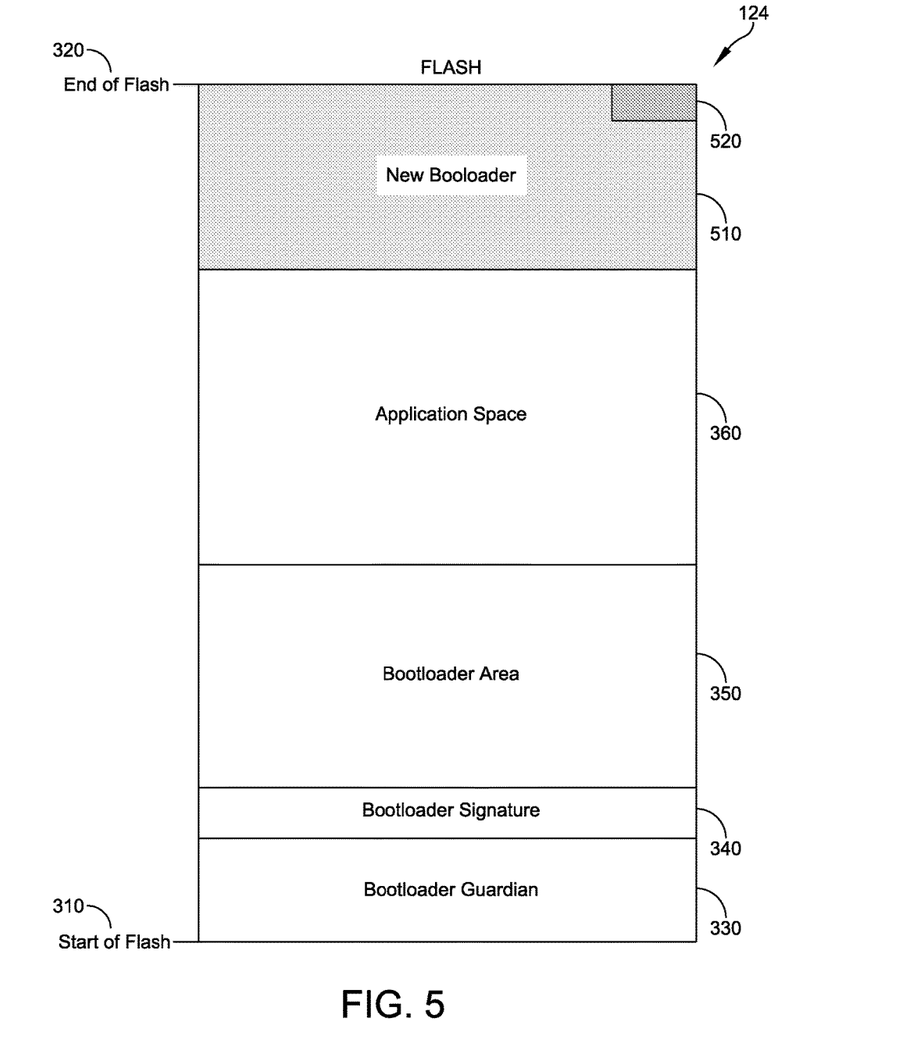
FIG. 5 is a schematic diagram of a further example allocation of flash memory to a set of firmware instructions in accord with aspects of the present disclosure.

Having received (block 410) and buffered (block 420) the new bootloader 510, and stored (block 430) the indicator 520 of the location of the new bootloader 510, the next major operation will be to copy the new bootloader 510 into its intended position in the memory 124, which is the bootloader area 530. An erasure of the bootloader area 530 may be required. The bootloader area 530 may be where the current bootloader 350 resides, and thus beginning an erasure or a copying into the bootloader area 530 of the memory 124 will invalidate the current bootloader 350, and if the copying of the new bootloader 510 fails to complete for any reason, the instruction set in the bootloader area 530 will be corrupt. Accordingly, the bootloader update process 400 stores, at block 440, a bootloader signature 340 that indicates the bootloader area 530 is untrustworthy (e.g., corrupt, invalid) before the process 400 erases the bootloader area 530 at block 450 and copies the new bootloader 510 into the bootloader area 530 at block 460. If the copying (block 460) of the new bootloader 510 into the bootloader area 530 completes successfully, the process 400 stores, at block 470, a bootloader signature 340 that indicates the bootloader area 530 contains a valid bootloader instruction set.

In embodiments, the bootloader signature 340 may have a particular value to indicate that the bootloader area 530 contains a valid bootloader instruction set, and any other value may indicate that the bootloader area 530 does not contain a valid bootloader instruction set. In other embodiments, the bootloader signature 340 may have a particular value to indicate that the bootloader area 530 does not contain a valid bootloader instruction set, and any other value may indicate that the bootloader area 530 does contain a valid bootloader instruction set.

In some embodiments, the current bootloader 350 may contain instructions to cause the processor 122 to perform the bootloader update process 400. Therefore, the current bootloader 350 may cause the processor 122 to copy at least a portion of code somewhere else, e.g., RAM, before it erases (block 450) the bootloader area 530 because the current bootloader 350 resides in the bootloader area 530, which will be erased or otherwise overwritten. The portion of code copied, e.g., to RAM, may be an instruction set necessary to carry out the remainder of the bootloader update process 400.

In embodiments, the new bootloader 510 may be buffered in a different memory other than the memory 124. In embodiments, the new bootloader 510 may be provided in a buffered location and therefor receiving (block 410) and buffering (block 420) may not be part of the process 400. In embodiments, block 430 and block 440 may be combined into one action by using the bootloader signature 340 as the indicator 520 that indicates the location and/or length of the new bootloader 510. For example, a bootloader signature 340 value of zero may indicate that the bootloader area 530 has a valid bootloader instruction set stored therein and a bootloader signature 340 value other than zero may be a pointer in memory 124 to the location of the new bootloader 510.

In embodiments, storing an indicator of an invalid bootloader (block 440) may be accomplished by erasing the area of the memory 124 that contains the bootloader signature 340. In embodiments, the bootloader signature 340 may be part of the bootloader, such as bootloader 350, so that erasing the bootloader area (block 450) also erases the bootloader signature 340 and therefore accomplishes storing an indicator of an invalid bootloader (block 440). Similarly, copying (block 460) a new bootloader 510 into the bootloader area 350 may therefore include writing the bootloader signature 340 and therefore accomplish storing an indicator of a valid bootloader (block 470). In alternate embodiments, the bootloader signature 340 (i.e., indicator of a valid bootloader) may be stored (block 470) in combination with copying (block 460) the new bootloader 510, or may be stored (block 470) as a separate step from copying (block 460) the new bootloader 510. Variations in storing (block 470) a bootloader signature 340 may beneficially accommodate various types of memory, such as those requiring entire blocks, pages, sectors, or the like, to be erased as a unit to be available for storing new information in any portion thereof.

The bootloader update process 400 will complete as described above unless it is interrupted. For example, a power outage during the process 400 may cause the bootloader update not to complete. If such an interruption occurs after the bootloader area 530 has begun to be erased (block 450) or copied into (block 460), the bootloader area 530 will not have a valid bootloader instruction set stored therein and the device may therefore fail to boot once power is restored. Aspects and embodiments disclosed herein, however, provide a recovery mechanism from such a scenario.

Figure 6:
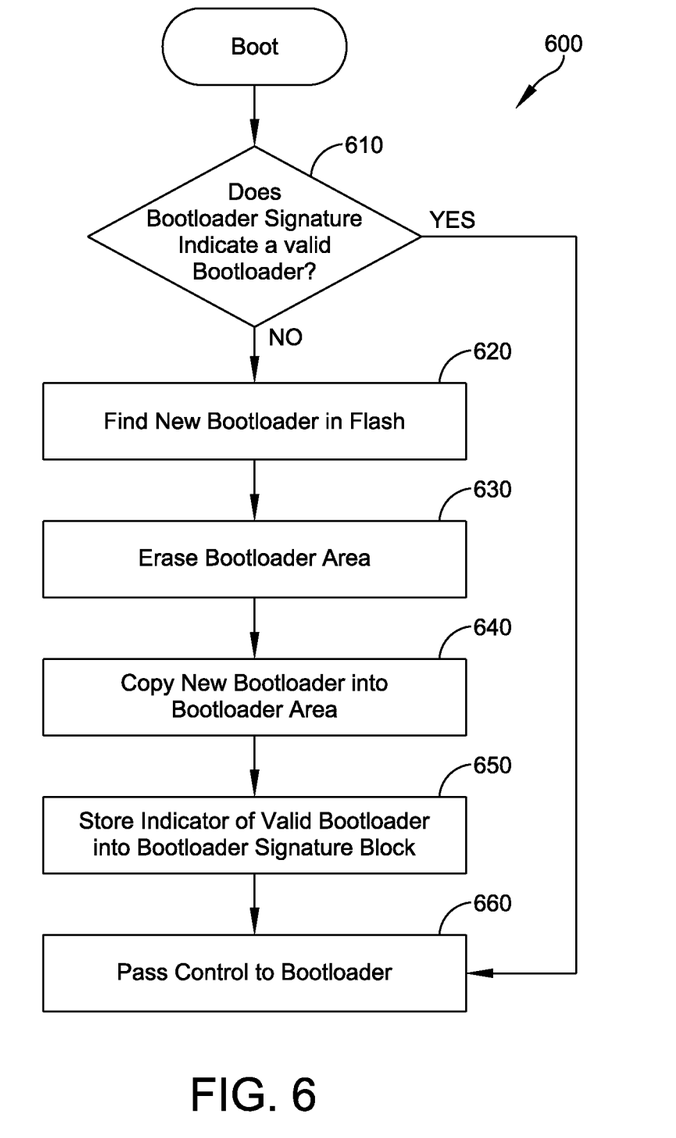
FIG. 6 is a flow diagram of an example process for booting a device in accord with aspects of the present disclosure.

FIG. 6 is a flow diagram illustrating at least one bootloader guardian process 600. The bootloader guardian 330 contains an instruction set that will cause the processor 122 to execute the process 600 whenever the device 100 boots up. The bootloader guardian 330 instruction set, in implementing the process 600, causes the processor 122 to check the bootloader signature 340 for an indication whether the bootloader area 530 contains a valid bootloader instruction set at decision block 610. If the bootloader signature 340 indicates a valid bootloader (YES) the processor 122 will continue with normal bootup operation by, e.g., passing control to the bootloader at block 660.

If the bootloader signature 340 indicates that no valid bootloader (NO) resides in the bootloader area 530, such as when a power failure or other interruption occurred during a bootloader update process 400 as discussed above, the process 600 will attempt to complete the bootloader update by finding the new bootloader 510 and copying the new bootloader 510 into the bootloader area 530. The process 600 finds the new bootloader 510 at block 620 by reading the indicator 520 (which may also be the bootloader signature 340 as described above), erases the bootloader area 530 at block 630, and copies the new bootloader 510 into the bootloader area 530 at block 640. When the copying (block 640) successfully completes, the process 600 stores, at block 650, a bootloader signature 340 that indicates the bootloader area 530 contains a valid bootloader instruction set. Next, the process 600 will cause the processor 122 to continue with normal operation by, e.g., passing control to the bootloader instruction set at block 660.

In embodiments, the bootloader guardian 330 may be a set of instructions that perform only the process 600 shown in FIG. 6 and therefore may be a relatively small set of instructions that may never itself need to be updated.

In embodiments, the bootloader update process 400 may behave differently than shown in FIG. 4. For example, rather than erase (block 450) the bootloader area 530 and copy (block 460) the new bootloader 510, the bootloader update process 400 may instead cause a reboot, which will in turn cause the bootloader guardian process 600 to erase the bootloader area 530 (block 630) and copy the new bootloader 510 (block 640) upon bootup.

Additionally, in embodiments, one or more of the process blocks described above and shown in FIG. 4 and FIG. 6 may be performed in a different manner or in a different order than that described or shown, or may not be performed at all. In alternatives, the bootloader update process 400 may be performed by an alternate processor rather than the processor 122, including by a temporarily coupled processor, for example, coupled to peripheral interface 134, or a maintenance interface incorporated with the controller 120. The memory 124 may be an onboard memory or a flash memory embedded in the processor 122 or in a microcontroller that includes the processor 122, or may be an external memory such as flash, an EEPROM, or other re-writable non-volatile memory. Buffering or other storage of data or instruction sets may be to other forms of memory, such as optical or magnetic disks, programmable ROM, RAM, or the like.

The device 100 may be a local or remote device and may have limited resources, such as memory, e.g., the memory 124, and the bootloader guardian 330 and the bootloader 350 may each conform to application-specific size parameters to be accommodated by, e.g., memory 124. The bootloader guardian 330 and the bootloader 350 may further conform to more stringent size requirements to allow the memory 124 to have sufficient storage capacity for core applications and/or operating systems in the application space 360. The memory 124 may include various storage media types, modes, or configurations, and may include a combination of multiple memories across one or more storage media types, modes, or configurations.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A device comprising:
a memory; and
a processor coupled to the memory and configured to:
determine that a bootloader instruction set in a designated bootloader memory execution location in a memory does not contain a valid bootloader instruction set,
access a replacement bootloader instruction set from a predetermined location in the memory;
store the replacement bootloader instruction set in the designated bootloader memory execution location;
validate the replacement bootloader instruction set utilizing a bootloader signature; and
execute, the replacement bootloader instruction set from the designated bootloader memory execution location.

2. The device of claim 1 wherein the processor is further configured to use at least one of a length of the bootloader instruction set and a memory pointer to locate the bootloader instruction set.

3. The device of claim 1 wherein the processor is further configured to buffer the bootloader instruction set and store an indicator of a location of the valid bootloader instruction set.

4. The device of claim 3 wherein the processor is further configured to store the indicator at a predetermined location of the memory.

5. A method of updating a bootloader instruction set for a device having a processor and a memory, the method comprising:
determining, that a designated bootloader memory execution location in a memory does not contain a valid bootloader instruction set;
accessing, a replacement a bootloader instruction set from a predetermined location in the memory;
storing the replacement bootloader instruction set in the designated bootloader memory execution location;
validating, the replacement bootloader instruction set utilizing a bootloader signature; and
executing, the replacement bootloader instruction set from the designated bootloader memory execution location.

6. The method of claim 5 further comprising using at least one of a length of the bootloader instruction set and a memory pointer to locate the bootloader instruction set.

7. The method of claim 5 further comprising buffering the bootloader instruction set and storing an indicator of a location of the bootloader instruction set.

8. The method of claim 7 wherein the indicator is stored at a predetermined location of the memory.

* * * * *